United States Patent [19]

Folsberg

[11] Patent Number: 5,417,760
[45] Date of Patent: May 23, 1995

[54] METHOD FOR MANUFACTURING OF NORMAL AS WELL AS ULTRA-FINE CEMENT

[75] Inventor: Jan Folsberg, Copenhagen, Denmark

[73] Assignee: F. L Smidth & Co. A/S, Denmark

[21] Appl. No.: 187,196

[22] Filed: Jan. 25, 1994

[30] Foreign Application Priority Data

Feb. 4, 1993 [DK] Denmark ................ 0128/93

[51] Int. Cl.⁶ ......................................... C04B 7/36
[52] U.S. Cl. .................................. 106/756; 106/762
[58] Field of Search ............. 106/756, 739, 743, 745, 106/751, 756, 757, 761, 762

[56] References Cited

U.S. PATENT DOCUMENTS

| | | | |
|---|---|---|---|
| 3,385,580 | 5/1968 | Ruegy | 106/751 |
| 4,173,487 | 11/1979 | Cohen | 106/751 |
| 4,220,476 | 9/1980 | Touborg | 106/756 |
| 4,331,452 | 5/1982 | Causey et al. | 51/123 |
| 4,392,890 | 7/1983 | Henin et al. | 106/751 |
| 5,054,694 | 10/1991 | Knobloch et al. | 241/24 |
| 5,058,813 | 10/1991 | Weit | 241/19 |

FOREIGN PATENT DOCUMENTS

| | | |
|---|---|---|
| 0280245 | 8/1988 | European Pat. Off. . |
| 0368648 | 5/1989 | European Pat. Off. . |
| 0359591 | 3/1990 | European Pat. Off. . |
| 366759 | 5/1990 | European Pat. Off. . |
| 406591 | 1/1991 | European Pat. Off. . |
| 0450579 | 4/1991 | European Pat. Off. . |
| 0496303 | 7/1992 | European Pat. Off. . |
| 3815217 | 11/1989 | Germany . |
| 3908752 | 9/1990 | Germany . |
| 3921823 | 1/1991 | Germany . |
| 0763288 | 9/1980 | U.S.S.R. ................ 106/751 |

*Primary Examiner*—Mark L. Bell
*Assistant Examiner*—Paul Marcantoni
*Attorney, Agent, or Firm*—Brumbaugh, Graves, Donohue & Raymond

[57] ABSTRACT

A method is described for manufacturing of normal as well as ultra-fine cement on the basis of cement materials, such as cement clinker, gypsum, slag, limestone, pozzolana, flyash etc. in a plant comprising at least a mill (1), a classifying separator (3), a separation cyclone (5) and a dust collector (7). By this method some of the dust-laden conveying gas which is extracted via the cyclone gas outlet duct (11) is diverted to and dedusted in the dust collector (7), and the dust from the dust collector (7) is utilized as the basis for ultra-fine cement, whereas the cyclone material from the material outlet (9) of the cyclone is utilized as normal cement. Hence it is possible to manufacture ultra-fine cement in existing grinding plants in a mechanically simple and operationally inexpensive way, while normal cement is simultaneously manufactured, without having any significant impact on the mill operation.

17 Claims, 1 Drawing Sheet

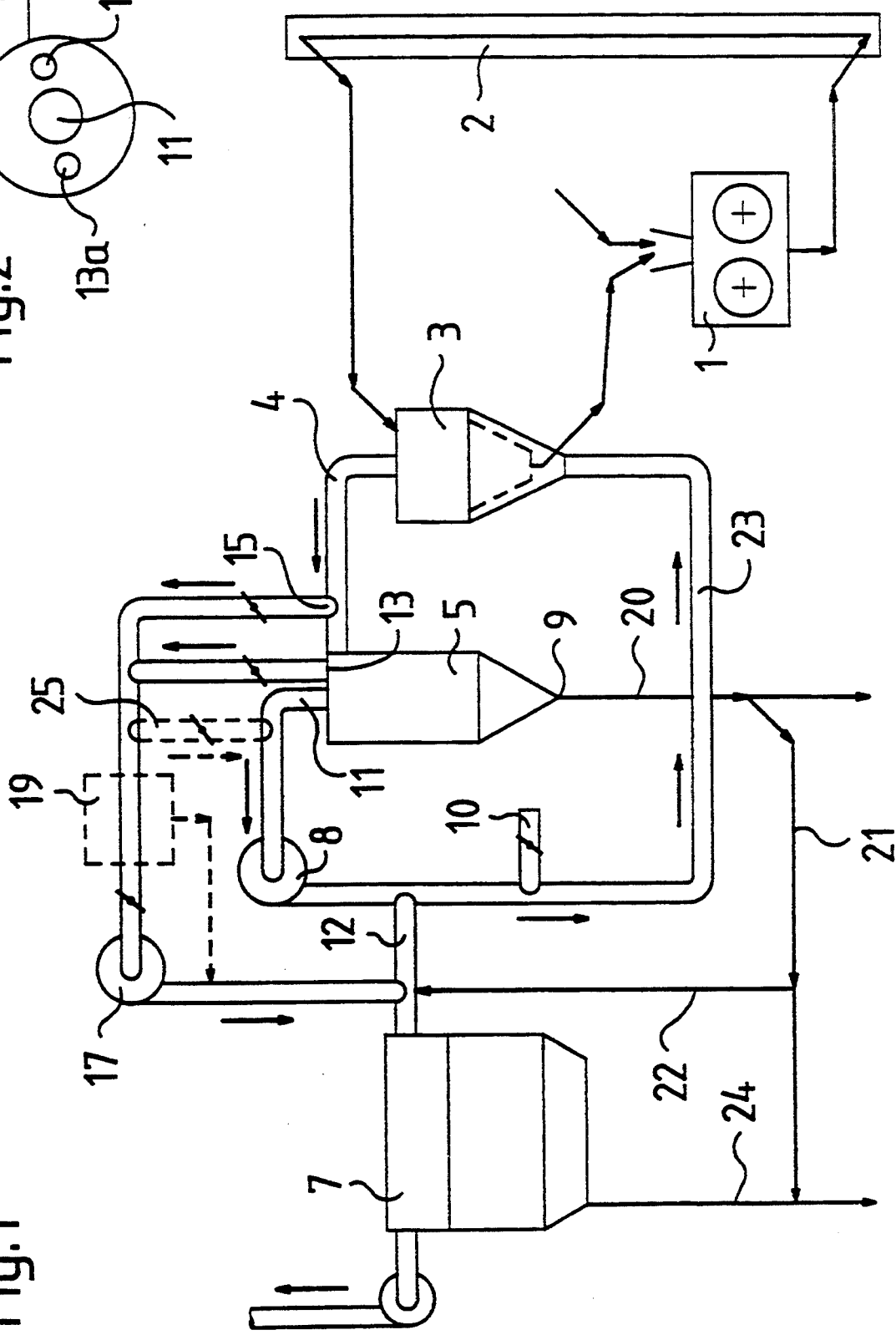

METHOD FOR MANUFACTURING OF NORMAL AS WELL AS ULTRA-FINE CEMENT

BACKGROUND OF THE INVENTION

The present invention relates to a method for manufacturing normal as well as ultra-fine cement on the basis of cement materials such as cement clinker, gypsum, slag, limestone, pozzolana, flyash etc. in a plant comprising at least a mill, a classifying separator, one or several separation cyclones and a dust collector, by which method the material is fed to and ground in the mill, and subsequently conveyed to the separator in which it is divided into a coarse fraction which is returned to the mill and into a fine fraction which suspended in a conveying gas is conducted to the cyclone in which the material/gas suspension is separated into cyclone material which is discharged via the material outlet of the cyclone and into dust-laden conveying gas which is discharged via the gas outlet duct of the cyclone, and whereof a partial quantity corresponding at least to the amount of false air present in the installation is subsequently via a duct conducted to and dedusted in the dust collector.

Apparently, there is a strong trend towards incorporation of very fine types of cement, as for example the so-called ultra-fine cement, in the product range of the cement manufacturers. By ultra-fine cement is meant cement having fineness in the range of 600–1000 $m^2/kg$, whereas the fineness of normal cement is in the range of 300–500 $m^2/kg$.

However, in actual practice it is difficult to manufacture cement having the degree of fineness which characterizes ultra-fine cement. When attempting to manufacture ultra-fine cement by means of open-circuit grinding, the tendency towards dry clogging will often be so pronounced as to result in a substantial deterioration of the grinding economy, and, further, it will often be impossible to manufacture cement having a fineness in excess of 800 $m^2/kg$. It is, however, possible to manufacture cement having such a fineness in closed-circuit plants, but this has the disadvantage that the circulating load or the circulation factor across the separator will be quite substantial, which in turn means that the specific power consumption of both the separator and the fan will be very high.

Plants of the kind mentioned in the introduction are known for example from DE 3908752-A1 and DE 3921823-A1. In both specifications methods are described by which cyclone material and dust from the dust collector are intermixed for producing the finished cement, but mention is not made in any of the specifications of utilizing the dust as a basic ingredient for producing ultra-fine cement.

SUMMARY OF THE INVENTION

It is the object of the present invention to provide a method for manufacturing of normal as well as ultra-fine cement in one single process, by which method the aforementioned disadvantages are remedied.

This is achieved according to the invention by means of a method of the kind mentioned in the introduction, being characterized in that the dust is extracted from the dust collector and utilized as the basis for ultra-fine cement, and in that the cyclone material is utilized as normal cement.

It is hereby achieved that ultra-fine cement can be manufactured in existing grinding plants according to a mechanically simple and operationally inexpensive method, while normal cement is simultaneously manufactured, and without having any significant impact on the mill operation.

The present invention is based on the recognition that the cyclones which are normally utilized in the cement-making industry have a separation efficiency ranging between 90 and 98%, which means that between 2% and 10% of the material being fed to the cyclone, substantially as dust, is not separated but discharged via the gas outlet duct together with the conveying gas. Since, at the same time, the so called cut size of these cyclones is very low, the fineness of this material or dust will be exceedingly high, being in the range of 800–1500 $m^2/kg$.

The dust from the dust collector can be used directly as ultra-fine cement, but it may become necessary in some cases to adjust the fineness and/or the chemical composition of the ultra-fine cement, and according to the invention this can be done by addition of dust-loaded conveying gas extracted from and/or before the cyclone, and/or by addition of cyclone material.

The dust-loaded conveying gas which is extracted from the cyclone and which is used to adjust the fineness and/or chemical composition of the ultra-fine cement may be extracted by a fan via one or several openings—being arranged eccentrically relative to the cyclone gas outlet duct—at the top of the cyclone, while the dust-loaded conveying gas which is extracted before the cyclone and used for adjusting the fineness and/or the chemical composition of the ultra-fine cement may be extracted via an opening in the cyclone inlet duct by means of the same fan.

In case of critical fan wear, the dust in the extracted, dust-loaded conveying gas may be separated in a dust collector, subsequently being conveyed past the fan and recharged into the conveying gas after the fan.

To achieve homogeneity of the ultra-fine cement, the dust-loaded conveying gas, and, respectively, the cyclone material, may be charged to and intermixed with the dust-laden conveying gas from the cyclone gas outlet duct prior to the introduction into the dust collector which may be effected in the duct leading to the dust collector.

The fineness and/or the chemical composition of the ultra-fine cement may also be adjusted by some of the cyclone material being charged to and intermixed with the dust subsequent to the extraction of the dust from the dust collector.

BRIEF DESCRIPTION OF THE DRAWINGS

The invention will in the following be described in further details with reference to the accompanying drawing, being diagrammatical, and where FIG. 1 shows a plant for carrying out the method according to the invention, and FIG. 2 shows a plan view of details of the plant in FIG. 1.

DESCRIPTION OF THE PREFERRED EMBODIMENT

The plant shown in FIG. 1 comprises a mill 1, a separator 3, a cyclone 5 and a dust collector 7 in the form of a precipitator. Fresh material for the cement manufacture is fed to and ground in the mill 1, which, in the example shown, is a roller press. The ground material is subsequently conducted for example by means of an elevator 2 to the separator 3 in which it is divided into a coarse fraction which is returned to the mill 1 and into a fine fraction which suspended in a conveying gas is conducted to the cyclone 5 via a duct 4. In the cyclone 5 the majority of the fine fraction from the conveying gas is separated in the form of cyclone material which is discharged via the material outlet 9 of the cyclone 5 and passed on via a duct 20. The conveying gas containing the residual amount of very fine material or dust is discharged via the gas outlet duct 11 of the cyclone 5 and is recirculated via a fan 8 and a duct 23 to the separator 3. Some of this dust-laden recirculating gas is conducted away via a duct 12 and dedusted in the dust collector 7. Fresh air in the form of atmospheric air or preheated air may be supplied to the system via a duct 10.

According to the invention the dust is extracted via a duct 24 from the dust collector 7, which, in the example shown, consists of a precipitator, and the dust is utilized as the basis for ultra-fine cement, whereas the cyclone material from the duct 20 is utilized as normal cement.

The expression "as the basis for" is intended to cover embodiments for ultra-fine cement where the dust from the dust collector 7 constitutes between 50 and 100%.

In the plant shown, the fineness and/or chemical composition of the ultra-fine cement can be adjusted in several ways. For example, cyclone material may be added via duct 21 directly to the dust in duct 24, or it may be added via duct 22 to the diverted, dust-laden conveying gas in the duct 12. Further, dust-loaded conveying gas may be extracted before and/or from the cyclone 5 via openings 15, 13 provided in the duct 4 and in the top of the cyclone 5, respectively, as shown in FIG. 2, and via a fan 17 and a possible dust collector 19 added to the diverted, dust-laden conveying gas in the duct 12.

FIG. 2 shows two openings 13 at the top of cyclone 5, but the cyclone 5 may incorporate a plurality of corresponding openings. The dust-loaded conveying gas is extracted from one or several of the openings 13, 15 dependent upon the fineness of the dust being required to obtain a desired fineness of the finished ultra-fine cement. The dust which is extracted via the opening 15 will thus have the coarsest characteristics and will typically lie within the range 300–500 $m^2/kg$, whereas the dust being extracted via the opening 13a will lie within the range 350–600 $m^2/kg$ and the dust being extracted via the opening 13b will lie within the range 400–800 $m^2/kg$.

In an alternative embodiment of the method according to the invention the dust-loaded conveying gas which is extracted via the openings 13 and 15 may be charged directly into the gas outlet duct 11 of the cyclone 5 via duct 25. This solution would require installation of control dampers in the various ducts. But, normally, this solution is not very attractive, since it will lead to an extremely high dust concentration in the gas which is drawn through the fan 8 and whereof a partial quantity is recirculated to the separator 3.

The plant described above is not constricted to the manufacturing of cements with different degree of fineness. In fact, the plant may be used for the manufacturing of any kind of pulverent material, where a particularly high fineness is required. Thus, the plant may with advantage be used for fine grinding coal, e.g. to be fired into a cement kiln.

I claim:

1. A method for manufacturing simultaneously two types of cement, a first cement having a fineness in the range of 300–500 $m^2/kg$, and a second ultra-fine cement having a fineness of 600–1000 $m^2/kg$, on the basis of cement materials selected from at least one of the group consisting of cement clinker, gypsum, slag, limestone, pozzolana, flyash in a plant comprising at least a mill, a classifying separator, one or several separation cyclones and a dust collector, by which method the material is fed to and ground in the mill, and subsequently conveyed to the separator in which it is divided into a coarse fraction which is returned to the mill and a fine fraction which suspended in a conveying gas is conducted to the cyclone in which the material/gas suspension is separated into cyclone material which is discharged via the material outlet of the cyclone and into dust-laden conveying gas which is discharged via the gas outlet duct of the cyclone, and whereof a partial quantity of the dust-laden conveying gas is subsequently via a duct conducted to and dedusted in the dust collector, and extracting the dust from the dust collector and utilizing the dust as the basis for the second ultra-fine cement and utilizing the cyclone material as said first cement.

2. A method according to claim 1, characterized in that the ultra-fine cement is adjusted by addition of dust-loaded conveying gas extracted from the cyclone.

3. A method according to claim 2, characterized in that the dust-loaded conveying gas which is extracted from the cyclone and which is used to adjust the ultra-fine cement is extracted by means of a fan via one or several openings—eccentrically arranged relative to the gas outlet duct—in the top of the cyclone.

4. A method according to claim 1, characterized in that the ultra-fine cement is adjusted by addition of dust-loaded conveying gas extracted before the cyclone.

5. A method according to claim 2, characterized in that the dust-laden conveying gas which is extracted before the cyclone and which is used to adjust the ultra-fine cement is extracted via an opening in the inlet duct of the cyclone by means of a fan.

6. A method according to claims 3 or 5, characterized in that the dust in the extracted dust-laden conveying gas is separated in a dust collector, and conveyed past the fan and re-charged into the conveying gas after the fan.

7. A method according to claims 2, 3 or 5, characterized in that the dust-laden conveying gas and respectively the cyclone material in the duct is charged to and intermixed with the dust-laden conveying gas from the gas outlet duct of the cyclone prior to the introduction into the dust collector.

8. A method according to claim 2, characterized in that some of the cyclone material is charged into and intermixed with the dust extracted from the dust collector.

9. A method according to claim 1, characterized in that the plant instead is for fine grinding coal.

10. A method for the simultaneous manufacture of a fine ground product and coarse ground product from a pulverulent material in a plant comprising at least a mill, a classifying separator, one or several separation cyclones and a dust collector, by which method the material is fed to and ground in the mill, and subsequently conveyed to the separator in which it is divided into a coarse fraction which is returned to the mill and a fine fraction which suspended in a conveying gas is conducted to the cyclone in which the material/gas suspension is separated into a cyclone material which is discharged via the material outlet of the cyclone and into dust-laden conveying gas which is discharged via the gas outlet duct of the cyclone, and whereof a partial quantity is subsequently conducted via a further a duct to, and dedusted in, the dust collector, characterized in that the dust is extracted from the dust collector and utilized as a fine ground product and in that the cyclone material is utilized as a coarse ground product.

11. A method according to claim 10, in which the fine product is adjusted by addition of dust-laden conveying gas extracted from the cyclone.

12. A method according to claim 11, in which the dust-laden conveying gas which is extracted from the cyclone and which is used to adjust the fine product is extracted by means of a fan via one or several openings eccentrically arranged relative to the gas outlet duct in the top of the cyclone.

13. A method according to claim 10, in which the dust-laden conveying gas is extracted before the cyclone and is used to adjust the fine product, said dust-loaded conveying gas being extracted via an opening in the inlet duct of the cyclone by means of a fan.

14. A method according to claim 12 or claim 13, in which the dust in the extracted dust-laden conveying gas is separated in a secondary dust collector, and conveyed past the fan and re-charged into the conveying gas after the fan.

15. A method according to any one of claims 11 to 13, in which the dust-laden conveying gas or the cyclone material is charged to the further duct and there intermixed with the dust-laden conveying gas from the gas outlet duct of the cyclone prior to the introduction into the dust collector.

16. A method according to claim 11, in which some of the cyclone material is charged into and intermixed with the dust extracted from the dust collector for producing fine product.

17. A method according to claim 10, in which the pulverulent material is coal.

* * * * *